United States Patent
Connor et al.

[15] 3,664,434
[45] May 23, 1972

[54] QUICK ATTACHABLE PLANTER DISK DEPTH DRUMS

[72] Inventors: Donald E. Connor, Plainfield; Charles Boetto, Naperville, both of Ill.

[73] Assignee: International Harvester Company, Chicago, Ill.

[22] Filed: July 17, 1970

[21] Appl. No.: 55,638

[52] U.S. Cl. ............................ 172/536, 85/1 H, 172/253, 111/88
[51] Int. Cl. ................... A01b 21/08, A01c 5/06, F16b 35/06
[58] Field of Search ......................... 111/87, 88; 85/1 H, 1 K; 172/536, 539

[56] References Cited
UNITED STATES PATENTS

| | | | |
|---|---|---|---|
| 2,920,587 | 1/1960 | Shriver | 111/88 |
| 1,306,100 | 6/1919 | Chadwick | 85/1 H |
| 1,296,275 | 3/1919 | Firth | 85/1 H |
| 1,958,497 | 5/1934 | Rivers | 85/1 H |

*Primary Examiner*—Robert E. Pulfrey
*Assistant Examiner*—C. W. Hanor
*Attorney*—Floyd B. Harmon

[57] ABSTRACT

In a planter having furrow opener discs and depth bands to control the depth of cut of the discs, means for quickly attaching the depth bands to the discs comprising a bolt having a rectangular head and a bolt retaining member adapted to be inserted into an opening in the disc and positioned therein to receive the bolt which secures the depth band to the disc.

1 Claim, 6 Drawing Figures

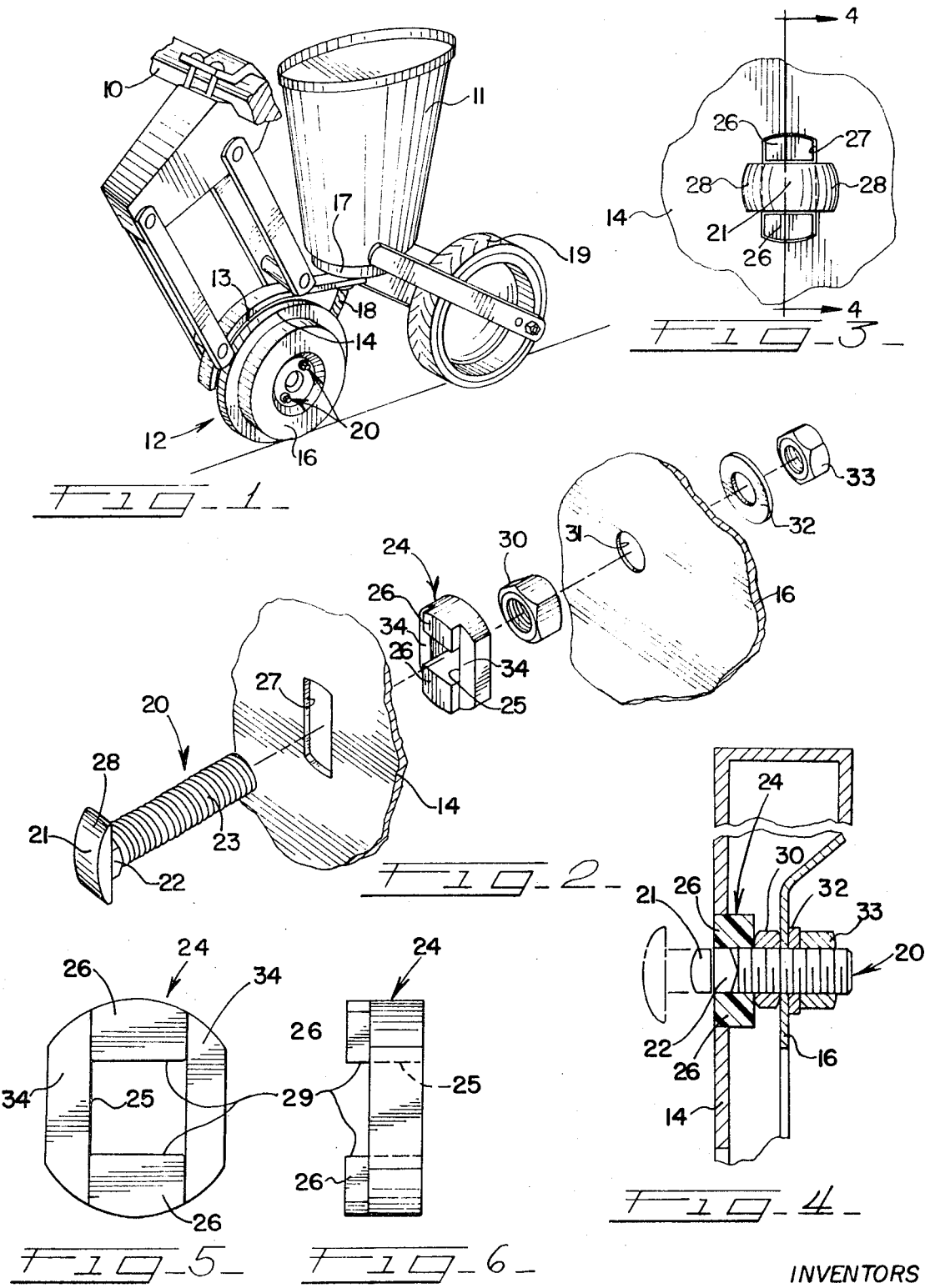

QUICK ATTACHABLE PLANTER DISK DEPTH DRUMS

BACKGROUND OF THE INVENTION

In planting implements having a pair of discs to open a furrow in which the seed is deposited, the practice has been to use depth bands to control the depth at which the discs penetrate the soil. In the past, in order to remove these depth bands or change from one size of depth band to another, for various soil conditions requiring different penetration depths, the operator was required to reach into the confined space between the pair of discs in order to insert or remove the bolt holding the depth bands to the discs. An alternative to this method was to permanently weld the bolts holding the depth bands to the discs directly to the face of the disc. However, when this method was used, and depth bands were not required, the protruding shafts of the bolts gathered trash and mud causing improper operation of the discs as furrow openers.

An object of this invention is the provision of novel removable fastening means for detachably securing one member to another member having only one readily accessible face.

Another object of this invention is to provide a simple and efficient means for quickly attaching and detaching depth bands to the discs of a planter furrow opener.

DESCRIPTION OF THE DRAWINGS

FIG. 1 is a perspective view of a planter incorporating the features of this invention;

FIG. 2 is an enlarged exploded view in perspective showing the installation of a depth band to a disc utilizing the principles of this invention;

FIG. 3 is a side view of the rectangular-headed bolt of this invention as viewed from between the discs;

FIG. 4 is a section taken along line 4—4 of FIG. 3;

FIG. 5 is an enlarged front elevational detail of the bolt retaining member of this invention; and FIG. 6 is a side view of the retaining member shown in FIG. 5.

DESCRIPTION OF THE PREFERRED EMBODIMENT

FIG. 1 shows an agricultural planter attached to a tool bar 10 which is in turn attached to a tractor, not shown. The planter consists of a seed hopper 11 and a furrow opener 12 which consists of a pair of discs 13 and 14 to each of which is attached a depth band 16, only one of which is shown. Seed is discharged from a seed hopper 11 through a seed metering device 17 into a seed discharge tube 18 which deposits seed behind the furrow opener 12. A press wheel 19 located at the rear of the planter covers up the furrow and the seed. As shown in FIG. 1, each of the depth bands 16 is secured to the respective discs 13 and 14 by fastening means in the form of quick attach bolts 20. The quick attach bolt 20, as best shown in FIG. 2, comprises a bolt having a substantially rectangular head portion 21 and a substantially square neck portion 22 and threaded shank portion 23. The quick attach bolt 20 is first inserted into a bolt retaining member 24, said retaining member having a square opening 25 therein substantially the same size as the square neck portion 22 of bolt member 20. The bolt retaining member 24 abuts the outer face of the disc and/or ears 26 has lugs adapted to register with a slotted opening 27 in the disc 13 or 14 to non-rotatably hold the retaining member 24 therein. The bolt member 20 is inserted into the retaining member 24 such that beveled projecting portions 28 of the bolt head 21 are substantially in line with the lugs 26 of retaining member 24. The bolt member and retaining member are then inserted into the slot 27 in disc 14. The threaded portion 23 of the bolt member 20 is then grasped and rotated 90° so that the long axis of the rectangular head 21 represented by portions 28 is now in alignment with the opening 29 formed by the space between lugs 26. Locknut 30 is then threaded onto the threaded portion 23 of the bolt member 20 and tightened against the retaining member 24.

The bolt member 20 is prevented from rotating by the lugs 26 of the bolt retaining member 24 which embrace opposite surfaces of the substantially square neck portion 22 of the bolt member 20. The bolt retaining member 24 also acts to center the bolt member 20 in the slot 27 of disk 14 to obtain the proper alignment of the bolt member 20 with the openings 31 in the depth band 16 as set forth below. This procedure is repeated such that each disc has at least two bolt members 20, as shown in FIG. 1, extending therefrom and secured as described above.

A depth band 16 has openings 31 therein which are adapted to register with the bolt members 20. The depth band 16 is placed over the threaded portion 23 of the bolt members 20 and is retained thereon against the bolts 30 by means of lock washers 32 and nuts 33 and wings 34 of retainer 24 engaging the outer face of the disc and serving along with locknut 30 to space the disc from depth band 16. When the use of depth bands is not required, as when the soil is very hard, all that is required to remove the depth band is to loosen the nuts 33 and remove the depth band 16. Nuts 30 are then loosened, the operator then grasps the threaded bolt portion 23 of each bolt member 20 and pushes it toward the disc while rotating it 90° such that the ears 28 of the bolt member 20 are now in alignment with the lugs 26 of the bolt retaining member 24 whereupon the bolt members 20 and the retaining members 24 are pulled through the slots 27 in the disc.

What is claimed is:

1. In a planter having a pair of disc furrow openers and depth bands to control the depth of cut of the disc furrow openers, a device for quick attachment of the depth bands to the disc comprising:

generally rectangular openings formed in said disc;

bolt members having a substantially rectangular head portion, a threaded portion, and a substantially square neck portion therebetween;

a bolt retaining member including, a retaining member surface for abutment against said disc, a substantially square opening formed in said bolt retaining member to receive the threaded portion and the substantially square neck portion of said bolt member, and lugs diametrically located with respect to and extending axially of said opening to thus provide a space therebetween conforming to the said square neck portion and said rectangular head portion of said bolt, said lugs extending through and conforming to said generally rectangular opening formed in said disc when said retaining member surface is abutted against said disc;

the substantially rectangular head portion of said bolt member adapted to be inserted through said generally rectangular opening formed in said disc and rotated 90° such that said square neck portion and said rectangular head portion can be received between and retained from rotation by said lugs;

fastening means received by the threaded portion of said bolt to secure the bolt member to the disc;

apertures formed in said depth bands for receiving the threaded portion of said bolts; and fastening means received by the threaded portion of said bolt for fastening said depth bands to said disc.

* * * * *